July 28, 1942.  K. H. HACHMUTH  2,290,957
PROCESS FOR TREATING GASEOUS MIXTURES
Filed Oct. 12, 1939
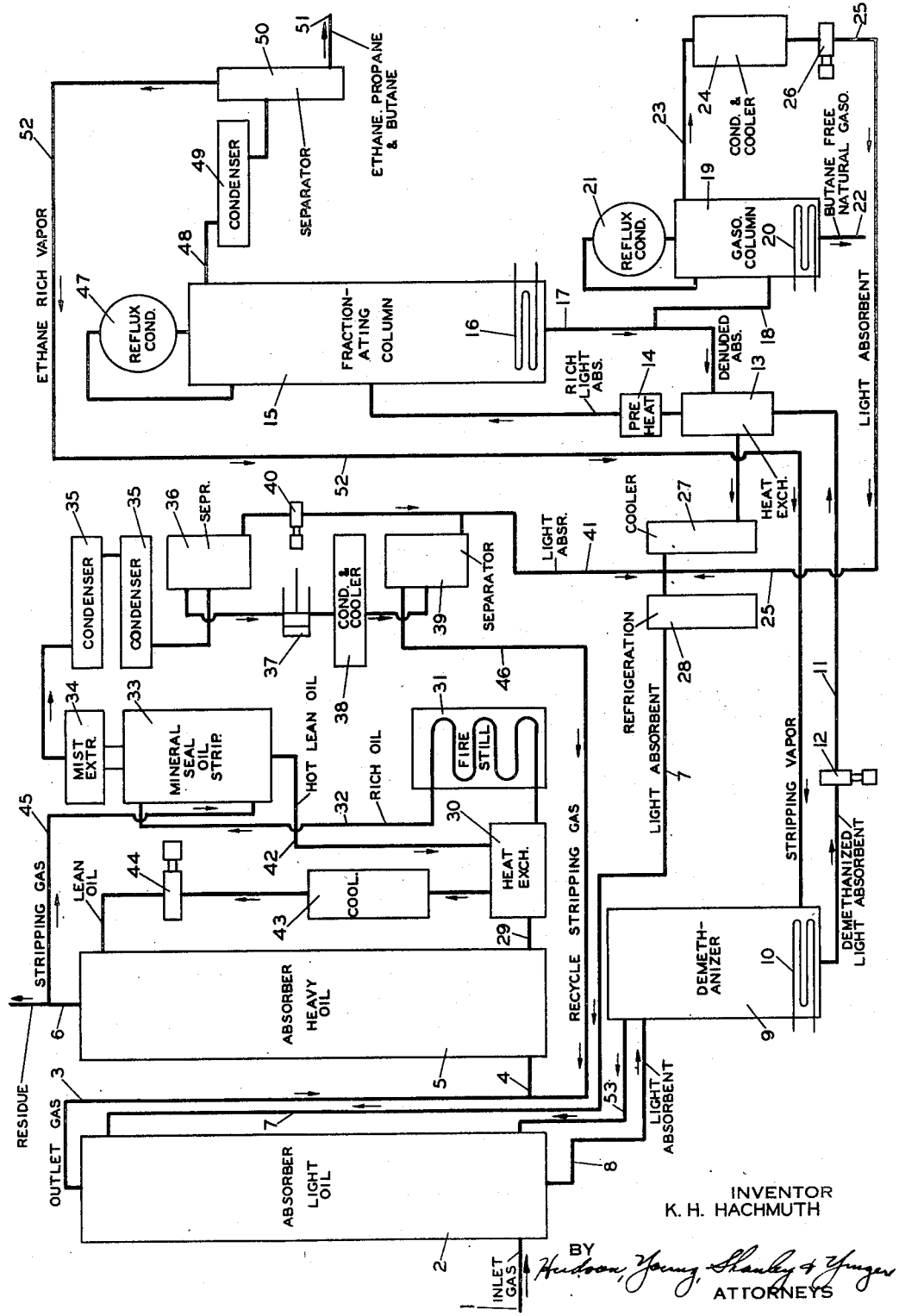
INVENTOR
K. H. HACHMUTH
BY Hudson, Young, Shanley & Yunger
ATTORNEYS Patented July 28, 1942

2,290,957

UNITED STATES PATENT OFFICE 2,290,957

PROCESS FOR TREATING GASEOUS MIXTURES

Karl H. Hachmuth, Bartlesville, Okla., assignor to Phillips Petroleum Company, a corporation of Delaware Application October 12, 1939, Serial No. 299,221

3 Claims. (Cl. 196—8)

The present invention relates to separation and recovery of desirable components from gaseous mixtures.

It is old and well known in the recovery of volatile hydrocarbons such as propane, butane, and natural gasoline from gases containing these components, to use two absorption media. In such cases one absorbent is lighter or more volatile than the other and is used to contact the gas in a first absorber relative to gas contact. A heavier absorbent is used in a second absorber to contact the gas which has previously been contacted with the light absorbent. Such processes have advantage over the older one absorbent systems in being able to use a light absorbent to recover completely the desirable lighter components. Any stripping of this light absorbent by the gas is taken care of by the heavier absorbent which recovers stripped components. Processes of this type are disclosed in United States Patents Nos. 2,117,548 and 2,074,644 issued to H. E. Drennan.

The present process differs from such processes and is an improvement over the same. The light absorbent in the latter type of process was made up of the heaviest components recovered from the gas. On the other hand in the present process the light absorbent is made up of a relatively pure fraction lighter than the finished gasoline.

The advantage of using this lighter fraction is that it will permit the recovery of not only all the gasoline contained in the inlet gas, but also large amounts of the lighter fractions so valuable as polymerization and gas conversion feed stocks. This is due to the higher absorptive capacity and also to the self-refrigerative capacity of the light absorbent in the first absorber. Another advantage is that the use of this lighter absorbent containing but very little of the heavier fractions permits denuding of the second or heavy absorbent at much more moderate conditions, since the light absorbent is easily driven from the heavy absorbent and since only very small amounts of heavier gasoline fractions will get into the heavier absorbent.

A primary object of the present invention is to provide an improved process for recovering the desirable components of a gaseous mixture using an absorbent which is lighter than the heaviest component to be recovered from the gaseous mixture.

A further important object of the present invention is to recover a fraction comprising propane, butane, pentane and heavier from a gas including the same using as an absorbent an intermediate fraction of that recovered.

The figure is a diagrammatic showing of apparatus for carrying out the present invention.

Referring to the figure, the gas to be treated enters through pipe 1, the bottom of the first absorber 2, wherein the gas is contacted with the light absorbent which is essentially pentanes containing only a minor proportion of heavier gasoline. Most of the propane, and practically all the butane, pentane and heavier are absorbed from the gas in absorber 2. The outlet gas is composed mainly of methane, ethane, some propane and a small amount of the light absorbent vaporized in the absorber. This outlet gas passes through pipe 3 to the inlet 4 of a second absorber 5. In this absorber the gas is contacted with a heavier absorbent such as mineral seal oil which picks up the light absorbent coming over from absorber 1 in the gas. The gas leaving absorber 5 is composed of methane and ethane with only traces of heavier components, and passes to residue pipe 6.

The light absorbent containing none or at least very little of any constituent lighter than pentane enters the top of absorber 2 through pipe 7. The enriched light absorbent passes out the base of absorber 2 through pipe 8 to a demethanizing zone 9 which is essentially merely the bottom section of a fractionating column. Heat may be applied through coil 10 in the usual manner, and an ethane rich gas is passed into the bottom of the demethanizing zone to aid in stripping the absorbent of the methane. The light absorbent passing down through the demethanizing zone gradually loses its methane and picks up in partial replacement part of the ethane and heavier from the stripping vapor. The rich light absorbent having been demethanized passes into a pipe 11 having a pump 12 interposed therein, and thence to heat exchanger 13 and a preheater 14 to a debutanizing column 15, which is a high pressure fractionating column. The usual re-boiler is shown at 16. In this column a sharp separation is made between pentanes and butanes. The bottom product consisting of the denuded light absorbent, plus pentanes and heavier absorbed from the gas, is withdrawn through pipe 17. Pipe 17 has a branch 18 leading to a gasoline column 19 having a steam coil 20, and a reflux condenser 21. In this column absorbed gasoline is separated as butane free natural gasoline which goes to storage through pipe 22. Overhead from gasoline column is withdrawn through pipe 23, condensed in condenser 24, and withdrawn through pipe 25 which has pump 26 interposed therein. The bottom product from debutanizing column 15 which is not diverted through branch 18, passes to heat exchanger 13, a cooler 27 and a refrigeration zone 28, thence through pipe 7 to the top of first absorber 2.

The heavy absorbent in absorber 5 enriched with stripped light absorbent from absorber 2 passes through pipe 29 to a heat exchanger 30 and a fire still 31, thence through pipe 32 to a stripper 33 where the light absorbent is stripped from the mineral seal oil and passes through mist extractor 34 or a knockout box to condensers 35 and separator 36. The vapor from separator 36 is compressed in compresser 37 and cooled in condenser and cooler 38, the condensate and gas passing into separator 39. The liquid from separators 36 and 39, that in 36 having its pressure raised by pump 40, passes through pipe 41 to join the light absorbent stream passing to the top of absorber 2. Condensate in pipe 25, which is overhead from gasoline column 19, also joins the light absorbent stream at this point.

The denuded mineral seal oil in the base of stripper 33 passes through pipe 42 through heat exchanger 30 and a cooler 43 to the top of absorber 5, its pressure being raised by pump 44. The stripping gas used in stripper 33 is taken from the residue line 6 through pipe 45. This stripping gas reappears with the vapor at separator 39. It is passed through pipe 46 to the base of absorber 5 to recover any light absorbent remaining uncondensed.

The overhead from debutanizing column 15 controlled by reflux condenser 47 passes through pipe 48 to a condenser 49, the condensate being collected in separator 50 from whence it is withdrawn through pipe 51 to storage or further treatment. Vapors from separator 50 are in large proportion ethane. These vapors flow through pipe 52 to the bottom of the demethanizing zone 9 wherein they are partially absorbed in the demethanizing step. The methane removed in this step plus unabsorbed stripping vapor are passed through pipe 53 to the base of absorber 2.

The natural gasoline constituents of the gas being treated are all absorbed in the first absorber. They then leave this absorber in the rich absorbent and pass, as has been stated above, through demethanizing zone 9 to the debutanizing column 15. The butane is removed in this column and the gasoline leaves the bottom of the debutanizer in the denuded light absorbent. It is a part of this denuded light absorbent of sufficient volume to contain an amount of gasoline equivalent to the amount absorbed which passes through branch 18 to gasoline column 19. The gasoline column separates the excess pentanes from the mixture fed to it, so that the remainder is exactly the composition of the butane free gasoline absorbed in the first absorber.

About 25% of the available ethane in the inlet gas is recovered by the system. It will be apparent however that the large recycle of ethane from the fractionator 15 demands more than 25% absorption of the total ethane entering absorber 2 which total ethane includes that in the inlet gas plus off gas from the demethanizer 9. The actual absorption of ethane in absorber 2, therefore, will be nearly 50% of the total ethane entering the absorber, permitting up to 95% absorption of propane in this absorber. Of course the amount of ethane and heavier recovered in absorber 2 may be varied as desired by changing the amount of absorbent.

To start the plant in operation only heavy absorbent in the second absorber is used, it being desirable to obtain all the light absorbent from the process itself. Since the system is so designed all pentanes and heavier can in this manner be absorbed in the second absorber, and will accumulate in separators 36 and 39, from which it is passed through light absorbent lines 41 and 7 to the top of absorber 2. In this absorber further absorption of lighter materials ultimately takes place so that the material leaving the demethanizer 9 contains gasoline plus some lighter fractions. This product goes to debutanizing column 15 wherein butane and lighter are removed as overhead product. The bottom product of this column, butane free gasoline, is recycled back to the absorber 2 as light absorbent, no product being withdrawn to the gasoline column. The light absorbent thus far has been gasoline product. This recycling of gasoline is continued until sufficient volume of light absorbent material has been accumulated for successful operation of the plant. The only product so far produced is the butane and lighter overhead from debutanizing column 15. When sufficient light absorbent has been accumulated a small stream is withdrawn through pipe 18 from the denuded light absorbent stream in 17 and passed to the gasoline column 19. Since it is desirable to obtain a light absorbent stream consisting essentially of pentanes and since the pentane concentration in the light absorbent has been up to this point essentially the same as that in our desired finished gasoline, enough material is withdrawn at 18 as feed for the gasoline column to give a bottom product that contains no pentane but sufficient to give a volume of bottom product equal to the quantity of butane free gasoline being absorbed in absorber 2. Since no pentane is being removed from the system it must increase in quantity in the recycle stream. Since as much pentane free gasoline is being removed from the system as there is butane free gasoline being recovered, the recycle absorbent stream cannot increase in quantity but must change in composition becoming richer in pentane. This procedure is continued, changing the volume of the stream to the gasoline column as its composition changes, so as to retain all the pentanes while still producing the recovered pentane free gasoline until the composition of the light absorbent to absorber 2 reaches the desired value. Pentane equivalent to the amount being absorbed from the inlet gas is then made a constituent of the bottom product in gasoline column 19. The system is then in equilibrium, circulating a light absorbent predominantly pentane with around 2 or 3% material heavier than pentane.

Another and possibly more convenient method of bringing the system to equilibrium is to circulate, as soon as a sufficient volume of light absorbent has accumulated, the volume of light absorbent and gasoline expected under equilibrium conditions to the gasoline column removing a small amount as bottoms and recycling the remainder including material heavier than pentane overhead through pipe 25 to absorber 2 as light absorbent. Ultimately an equilibrium condition would be obtained without the necessity of continuously changing the flow through pipe 18 to gasoline column 19.

Obviously the pentane concentration in the light absorbent may be controlled by changing the volume of the stream going to the gasoline column. The larger this stream the greater the pentane concentration. If it were desirable to circulate a light absorbent containing pentanes and no heavier material, all the bottom product from column 15 would be circulated to column 19 using the overhead from column 19 plus recovered pentanes from absorber 5 as absorbent material. Conversely the smaller the stream to column 19, the more nearly the light absorbent will approach the normal gasoline composition.

It will be evident that this system could be operated so as to use mainly butanes as the light absorbent if so desired. This would be accomplished by operating the debutanizing column at first so as to prevent butanes from going overhead. The butane would then accumulate to any degree desired, when the normal amount of butane could be removed overhead bringing the system to an equilibrium condition. By suitable choice of conditions for the debutanizing column, the light absorbent stream could be made to attain any composition between nearly pure butane and nearly pure pentane if desirable. At the same time of course the amount of absorbent circulated to absorbent 5 would have to be changed to insure absorption of the volatilized light absorbent from absorber 2 whatever its composition.

It should be understood that the practice of this invention is not restricted to apparatus described and shown. Also greater or lesser recovery of ethane, propane and butanes could be readily brought about by changing absorbent rates, temperatures, pressures, etc. depending on economic or other considerations.

I claim:

1. A process for treating a hydrocarbon gaseous mixture which includes a difficultly liquefiable fraction, and a readily liquefiable fraction, the readily liquefiable fraction being made up of a light fraction and a heavy fraction, comprising contacting the gaseous mixture in an absorption zone with an absorbent consisting substantially entirely of the light fraction, passing the enriched absorbent to a fractionating zone wherein the difficultly liquefiable fraction is removed from the absorbent as overhead, removing bottom product from the fractionating zone and passing the same to a second fractionating zone, removing as bottom product from the second fractionating zone the readily liquefiable fraction at the rate the same is absorbed in the absorption zone, passing overhead from the second fractionating zone to the absorption zone as absorbent, passing gaseous effluent of the absorption zone in contact with a second absorbent in a second absorption zone, separating light fraction absorbed in the second absorbent and passing the light fraction so separated to the first absorption zone as absorbent.

2. A process for treating a hydrocarbon gaseous mixture which includes a difficultly liquefiable fraction, and a readily liquefiable fraction, the readily liquefiable fraction being made up of a light fraction and a heavy fraction, comprising contacting the gaseous mixture in an absorption zone with an absorbent consisting substantially entirely of the light fraction, passing the enriched absorbent to a fractionating zone wherein the difficultly liquefiable fraction is removed from the absorbent as overhead, removing as bottom product from the fractionating zone the readily liquefiable fraction and passing the same to a second fractionating zone, removing as bottom product from the second fractionating zone the heavy fraction previously absorbed in the absorption zone, and passing overhead light fraction from the second fractionating zone to the absorption zone as a portion of the absorbent, passing gaseous effluent of the said absorption zone in contact with a second absorbent in a second absorption zone, separating said gaseous effluent absorbed in the second absorbent, condensing said effluent, and separating the condensate into additional light fraction and uncondensed gases, passing the condensed light fraction to the first absorption zone as additional absorbent and the uncondensed gases into the second absorption zone.

3. A process for recovering ethane, propane, butane, pentane and heavier from a hydrocarbon gas mixture containing the same comprising contacting the gaseous mixture with an absorbent consisting essentially of pentane in an absorption zone, passing the enriched absorbent to a fractionating zone wherein a fraction comprising ethane, propane and butane is removed as overhead, condensed and separated into ethane, propane and butane condensate and ethane containing vapor, passing this vapor to the absorption zone, passing the bottom product from the fractionating zone to a second fractionating zone, withdrawing bottom product from the second fractionating zone comprising pentane and heavier at a rate the same is being absorbed in the absorption zone, the overhead from the second fractionating zone comprising pentane being recycled to the absorption zone as a portion of the pentane absorbent, passing gaseous effluent of the absorption zone in contact with a second absorbent in a second absorption zone, separating the absorbed effluent from the second absorbent, condensing said separated effluent into light fraction condensate consisting essentially of pentane, and passing same to the first absorption zone as additional pentane absorbent, and uncondensed gases and passing same into the second absorption zone.

KARL H. HACHMUTH.